US006641756B2

(12) United States Patent
Lee et al.

(10) Patent No.: US 6,641,756 B2
(45) Date of Patent: Nov. 4, 2003

(54) METHOD FOR PREPARING ZINC SULFIDE BASED PHOSPHOR HAVING EFFECTIVE EMISSION AT LOW VOLTAGES

(75) Inventors: Soo-joung Lee, Seoul (KR); Jae-eun Jang, Seoul (KR)

(73) Assignee: Samsung SDI Co., Ltd. (KR)

( * ) Notice: Subject to any disclaimer, the term of this patent is extended or adjusted under 35 U.S.C. 154(b) by 0 days.

(21) Appl. No.: 09/852,280

(22) Filed: May 10, 2001

(65) Prior Publication Data

US 2002/0043648 A1 Apr. 18, 2002

(30) Foreign Application Priority Data

May 10, 2000 (KR) .......................... 2000-25041

(51) Int. Cl.$^7$ ..................... C09K 11/54; C09K 11/56
(52) U.S. Cl. ................................. 252/301.6 S
(58) Field of Search ..................... 252/301.6 S

(56) References Cited

U.S. PATENT DOCUMENTS 3,704,232 A 11/1972 Frey et al.
4,925,593 A 5/1990 Borchardt et al.

*Primary Examiner*—C. Melissa Koslow
(74) *Attorney, Agent, or Firm*—Burns, Doane, Swecker & Mathis, L.L.P.

(57) ABSTRACT

A method for preparing a zinc sulfide phosphor having effective emission at low voltages. In the method for synthesizing a green-light emitting zinc sulfide based phosphor, ZnS:Cu, Al, which is applicable to a device operated with a low voltage, novel raw materials are employed. CuI is used as an activator, wherein monovalent copper ($Cu^{1+}$) is complexed with ammonia and the ammonia complex is incorporated so as to uniformly distribute the activator in the mixture of raw materials. $AlF_3$ is used as a co-activator, and, $ZnI_2$ and NaI are added as iodide series fluxes. Thus, the color display characteristics are improved with a relatively high color purity and luminance.

10 Claims, 9 Drawing Sheets

METHOD FOR PREPARING ZINC SULFIDE BASED PHOSPHOR HAVING EFFECTIVE EMISSION AT LOW VOLTAGES

This application claims priority under 35 U.S.C. §§119 and/or 365 to Application 00-25041 filed in Republic of Korea on May 10, 2000; the entire content of which is hereby incorporated by reference.

BACKGROUND OF THE INVENTION

1. Field of the Invention

The present invention relates to a method for preparing a zinc sulfide based phosphor having effective emission at low voltages.

2. Description of the Related Art

ZnS:Cu, Al phosphors, green-light-emitting sulfide based phosphors, have been extensively used in a variety of display devices. Commercially available ZnS:Cu, Al phosphors are prepared using $CuSO_4$ as an activator, $Al(NO_3)_3$ and $Al(SO_4)_3 \cdot 18H_2O$ as co-activators, and $ZnCl_2$ and $NaCl$ as fluxes. Such sulfide based phosphors are suitable for use in display devices operated with high voltages, such as cathode ray tubes (CRTs). However, the sulfide based phosphor is inappropriate in display devices operated with low voltages.

In field emission displays (FEDs) driven at low voltages, emission of a phosphor is accelerated by a low electron energy of 1 kV or less. The penetration depth of electrons into a phosphor particle does not exceed a few nanometers, and excitation voltage and phosphor emission efficiency are low, thereby causing high current density. Since movement of charges occurs at the surface of phosphor, the surface of phosphor particle must be carefully considered, especially for the application in a low-voltage device. Thus, many approaches have been actively carried out to develop phosphors suitable for FEDs driven with low voltages.

In developing a new phosphor for a particular use, and improving the characteristics of phosphor, a variety of techniques have been adopted. For example, the characteristics of phosphor can be enhanced by appropriately choosing high-purity raw materials and fluxes, and by carefully conditioning the firing process and the post-treatment process after the synthesis of phosphor.

In addition, for utility in display devices operated with low voltages, which have the problems of low emission efficiency and high current density due to their low excitation voltage, as previously mentioned, a surface treatment technique has been applied to phosphors so as to decrease the current density.

SUMMARY OF THE INVENTION

To solve the above problems, it is an objective of the present invention to provide a method for preparing a zinc sulfide based phosphor having effective emission for use in devices operated with a driving voltage as low as 300 to 1000 eV, the phosphor having a particular composition including an activator, a co-activator and the fluxes.

The objective of the present invention is achieved by a method for preparing a zinc sulfide based phosphor having effective emission at low voltages, the zinc sulfide based phosphor comprising Cu as an activator, and Al as a co-activator, the method comprising the steps of; (a) weighing ZnS, CuI, $AlF_3$ and at least two iodide series fluxes having a high purity, and uniformly mixing the ZnS, CuI, $AlF_3$ and the at least two iodide series fluxes with deionized water to form a paste; (b) drying the paste and sieving to form uniform particles, and firing the particles to obtain phosphors; and (c) sieving and washing the phosphors with deionized water to remove impurities and the fluxes from the phosphors.

Preferably, the monovalent copper ($Cu^{1+}$) is complexed with ammonia. The monovalent copper ($Cu^{1+}$) may be mixed in an amount of 0.003 to 7.10% by weight. Preferably, in step (a), $AlF_3$ is mixed in an amount of 0.002 to 0.15% by weight, and NaI as the iodide series metal is mixed in an amount of 0.005 to 2.0% by weight. $ZnI_2$ as the iodide series metal may be mixed in an mount of 0.002 to 2.0% by weight. Preferably, in step (b), the particles are put into a carbon crucible and are fired in a reduction atmosphere so as to prevent the phosphors from being oxidized during the firing.

BRIEF DESCRIPTION OF THE DRAWINGS

The above objective and advantages of the present invention will become more apparent by describing in detail preferred embodiments thereof with reference to the attached drawings in which.

DETAILED DESCRIPTION OF THE INVENTION

Figure 1:
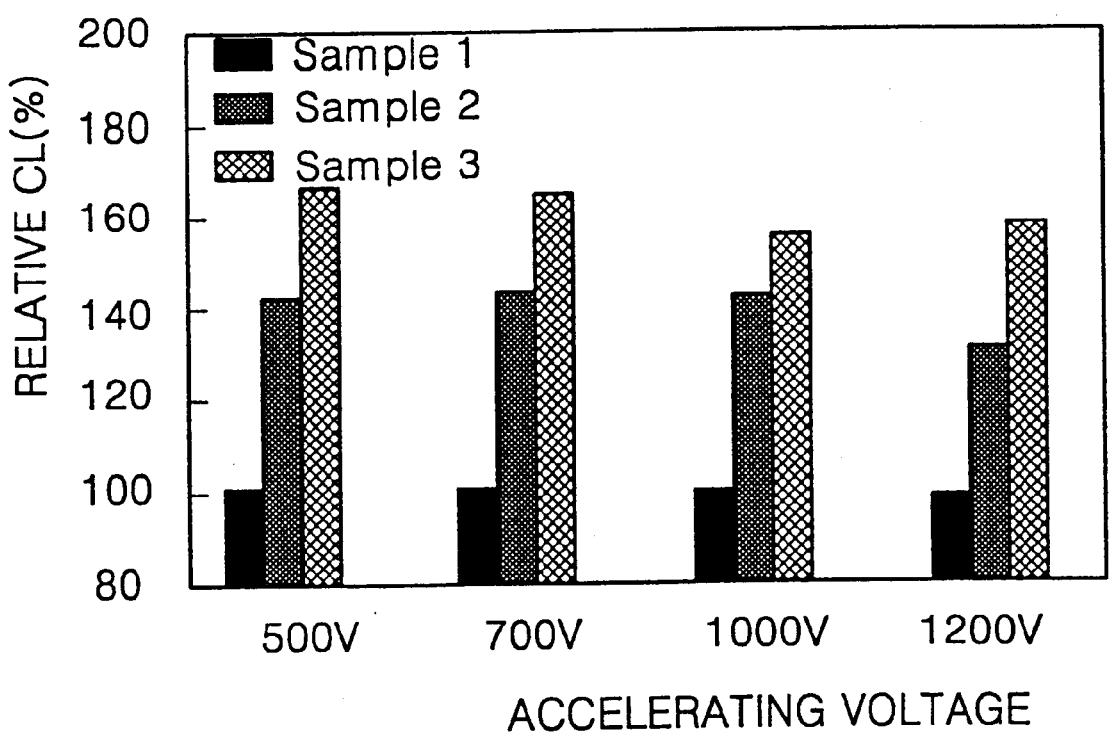
FIG. 1 is a graph showing the relative cathodoluminescence (CL) of phosphors prepared in Example 1 with respect to the variation of accelerating voltage, which was measured using a thermionic electron gun in a UHV chamber at $10^{-7}$ Torr.

A method for preparing a zinc sulfide based phosphor (ZnS:Cu, Al) having effective emission at a low driving voltage, for example, as low as 300 to 1000 eV, according to the present invention is characterized in that an activator, a co-activator and fluxes, which are different from those used in a conventional phosphor, are used to enhance the characteristics of the phosphor.

The difference in composition is shown in Table 1.

TABLE 1

| Component | Prior Art | Present Invention |
|---|---|---|
| Activator | $CuSO_4$ | CuI |
| Co-activator | $Al(NO_3)_3$ or $Al(SO_4)_3 \cdot 18H_2O$ | $AlF_3$ |
| Flux 1 | $ZnCl_2$ | $ZnI_2$ |
| Flux 2 | NaCl | NaI |

For the preparation of preparing a green-light emitting phosphor, ZnS:Cu,Al, the initial components listed in Table 1, having high purity, are weighted with accuracy. Next, the weighted components are mixed with a small amount of deionized water to form a paste. After drying the paste and sieving to produce more uniform particles, the resultant product is subjected to a firing process. For the firing process, the particles passed through a sieve are put into a carbon crucible and fired in a reduction atmosphere so as to prevent the phosphors from being oxidized during the firing. After the firing process, the phosphor is sieved again to remove the impurities and fluxes from the phosphor. Then, the sieved phosphor is washed with deionized water several times.

The features of the present invention, which can solve a conventional problem, are as follows.

First, Cu is used as an activator. Here, the monovalent copper ($Cu^{1+}$) is complexed with ammonia, and the ammonia complex is incorporated so as to evenly distribute the activator in the mixture of initial components.

Second, Al is used as a co-activator.

Third, iodide series fluxes, $ZnI_2$ and NaI, are used.

The present invention will be described in greater detail by means of the following examples. The following examples are for illustrative purposes and not intended to limit the scope of the invention.

EXAMPLE 1

Preparation of Phosphors

For comparison, two existing phosphors were synthesized by the methods disclosed in U.S. Pat. Nos. 3,704,232 and 4,925,593 (Samples 1 and 2), using the same raw materials as in the patents. A phosphor according to the present invention was prepared using new raw materials and labeled with Sample 3. For the preparation of Sample 1, $CuSO_4$ and $Al(NO_3)_3$ were used as an activator and a co-activator, respectively, without using any flux, and a firing process was carried out at 1050° C. for 40 minutes. For Sample 2, a phosphor was synthesized using the same activator and co-activator used for Sample 1, and chloride series fluxes ($ZnCl_2$ and NaCl), and fired at 950° C. for 40 minutes. For Sample 3 according to the present invention, Cu and Al were used as an activator and a co-activator, respectively. The activator and co-activator were mixed with two iodide series fluxes, $ZnI_2$ and NaI, and fired at 950° C. for 40 minutes. The initial components used for the preparation of each phosphor are listed in Table 2.

TABLE 2

| Initial Components | Sample 1 | Sample 2 | Sample 3 |
|---|---|---|---|
| Host matrix | ZnS | ZnS | ZnS |
| Activator | $CuSO_4$ | $CuSO_4$ | CuI |
| Co-activator | $Al(NO_3)_3$ | $Al(NO_3)_3$ | $AlF_3$ |
| Flux 1 | — | $ZnCl_2$ | $ZnI_2$ |
| Flux 2 | — | NaCl | NaI |

EXAMPLE 2

Measurement of Luminance and Chromaticity Coordinates

The cathodoluminescence (CL) for all three samples was measured using a thermionic electron gun in a UHV chamber (at $10^{-7}$ Torr or less). For the CL measurement, the accelerating voltage was varied at 500, 700, 1000 and 1200 eV. The result is shown in FIG. 1. The luminance was represented as a relative value with respect to the luminance of Sample 1. The phosphor synthesized using chloride series fluxes (Sample 2) has a luminance of about 130 to 140% at the accelerating voltages. The phosphor prepared using iodide series fluxes (Sample 3), on the other hand, shows a luminance of about 154 to 163%. The use of iodide series fluxes improves the luminance of phosphor by about 20% of that of the chloride series fluxes based phosphor.

Figure 2:
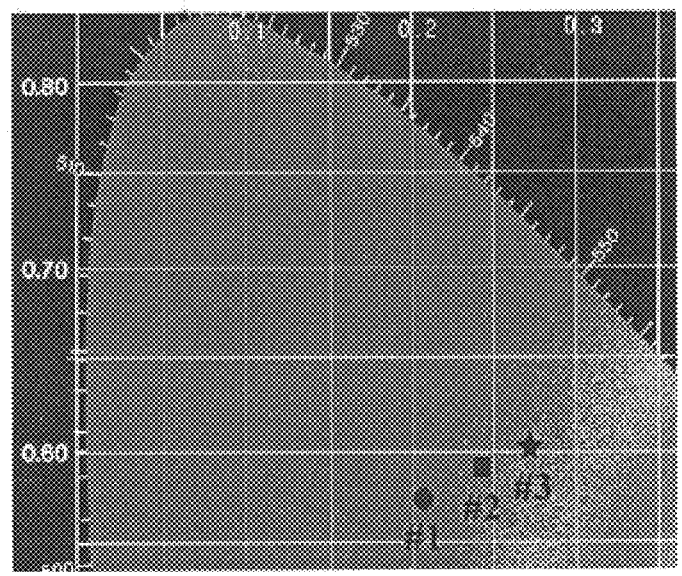
FIG. 2 is a CIE chromaticity diagram for three phosphors prepared in Example 1.

Referring to FIG. 2, the chromaticity coordinates at 1 kV are superior for the iodide series fluxes based phosphor (Sample 3). The above results indicate that the phosphor synthesized using the new materials listed in Table 1 has improved luminance and color display characteristics, compared to the other phosphors.

EXAMPLE 3

Image Measurement Using Scanning Electron Microscopy

Figure 3A:
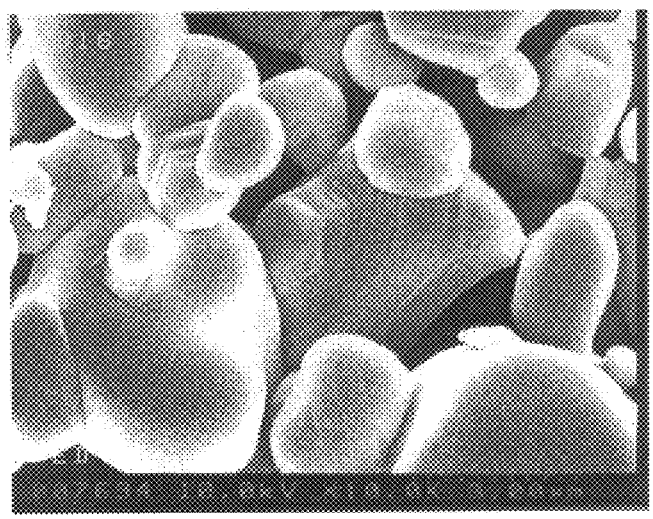
FIGS. 3A through 3C are scanning electron microscopy (SEM) images of the three phosphors prepared in Example 1.
Figure 3B:
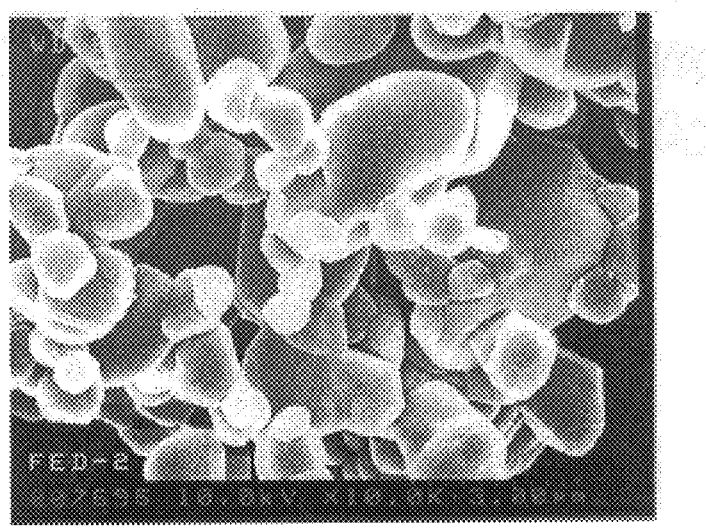
Figure 3C:
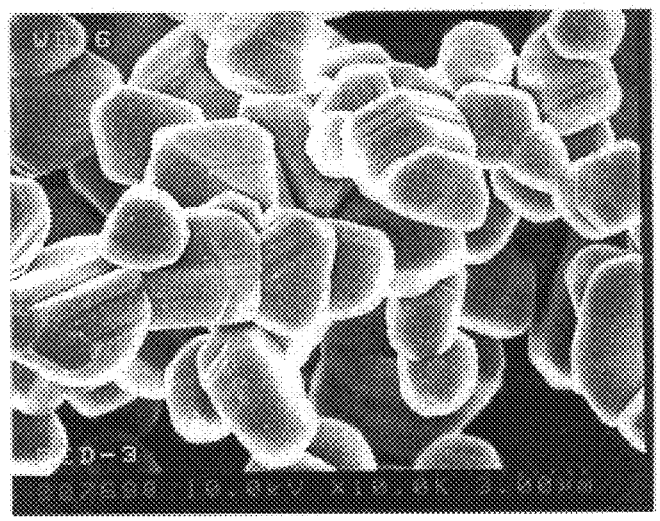

Scanning Electron Microscopy (SEM) photos were taken for Samples 1, 2 and 3 prepared in Example 1. The SEM photos are shown in FIGS. 3A through 3C. The average particle size is in the range of 1 to 3 $\mu$m for all samples, and some large particles are also detected. For Sample 1 prepared with any flux, almost crystals have a round shape. Meanwhile, some microcrystals are shown for Samples 2 and 3. However, the new phosphor prepared using the iodide series fluxes has more microcrystals than Sample 2 synthesized using the chlorine series fluxes. Morphology of phosphors are affected by the type of flux and the firing condition. The effect of the type of flux used for preparation of phosphors on the morphology is more serious.

It is considered that the reason for the different morphology between the phosphors synthesized using chloride and iodide series fluxes is the difference in reaction rate between the two fluxes. Since the reaction speed of the chloride series fluxes is faster than that of the iodide series fluxes, the phosphor crystals are grown around many axes by the flux during the firing process. As a result, such round crystals are formed. Meanwhile, for the iodide series fluxes which grows phosphor crystal with a relative low speed, phosphor crystals are grown by the flux around only one axis, and thus the resulting crystals have a plate or column shape.

EXAMPLE 4

Measurement of Crystalline Structure by X-Ray Diffraction.

Figure 4:
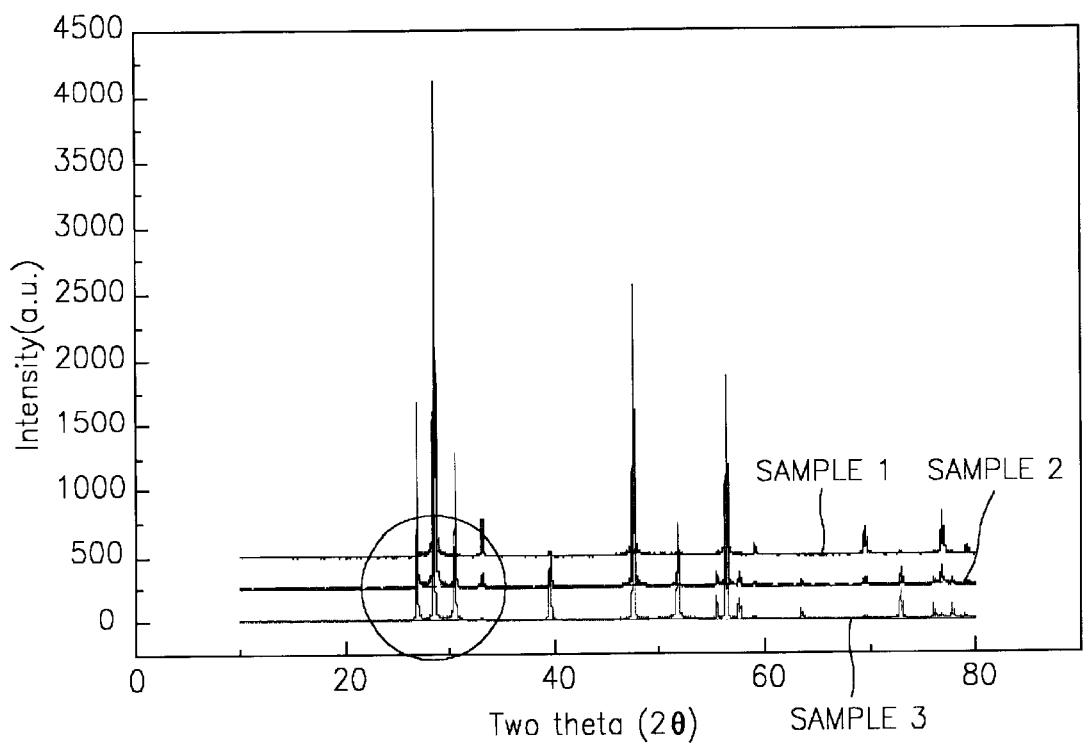
FIG. 4 shows X-ray diffraction (XRD) patterns of the three phosphors prepared in Example 1.
Figure 5:
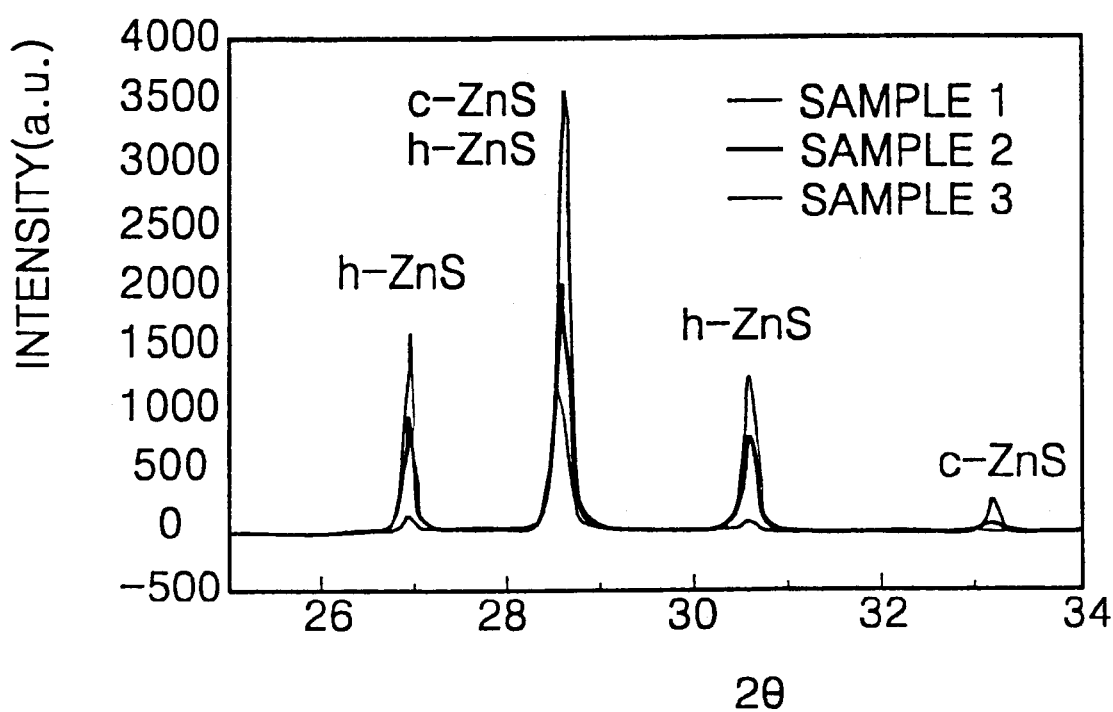
FIG. 5 is a magnified XRD pattern of the circled portion in FIG. 4.

In order to investigate the effect of fluxes on the crystalline structure of phosphor, X-ray diffraction (XRD) patterns for Samples 1, 2 and 3 were measured. The result is shown in FIG. 4. It appears that the lattice constant of crystals is not changed according to the initial constituents used for the synthesis of ZnS:Cu,Al phosphor while the crystalline characteristics are varied. Almost crystals are formed of ZnS, and have both hexagonal and cubic phases. The circled portion of FIG. 4 is shown in greater detail in FIG. 5. The peaks of cubic phase increases for Sample 1, Sample 2 and Sample 3, consecutively. The peaks of hexagonal phases, on the other hand, decreases for Sample 1, Sample 2 and Sample 3, consecutively. The result evidences that the cubic phase is more desirable than the hexagonal phase in terms of luminance.

EXAMPLE 5

Measurement of Crystalline Structure by Transmission Electron Microscopy

Figure 6:
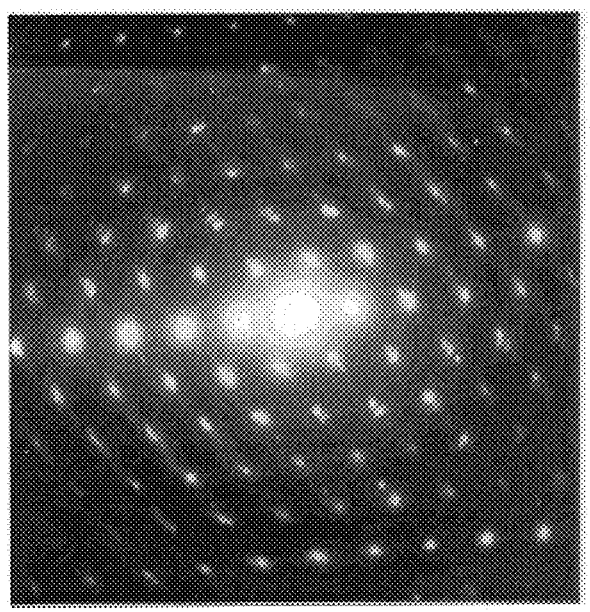
FIG. 6 shows an electron diffraction pattern of Sample 1.
Figure 7A:
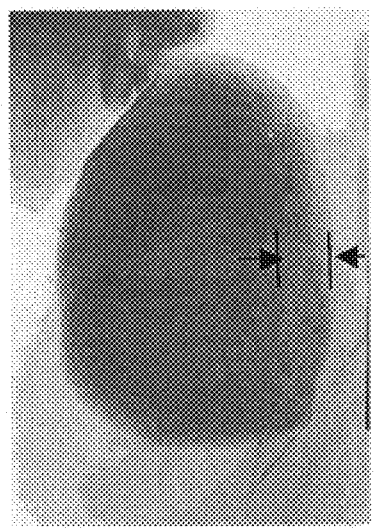
FIGS. 7A through 7C are transmission electron microscopy (TEM) images of the three phosphors.
Figure 7B:
Figure 7C:
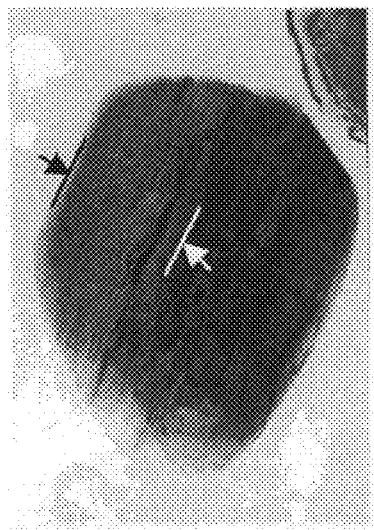
Figure 8:
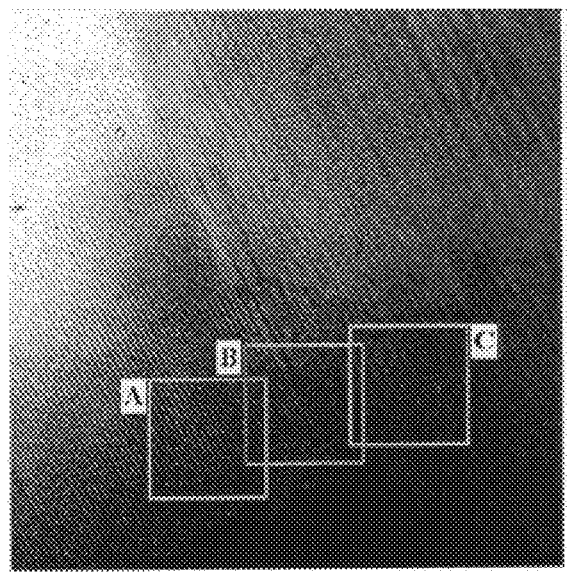
FIG. 8 is a high resolution transmission electron microscopy (HRTEM) image of Sample 1.
Figure 9A:
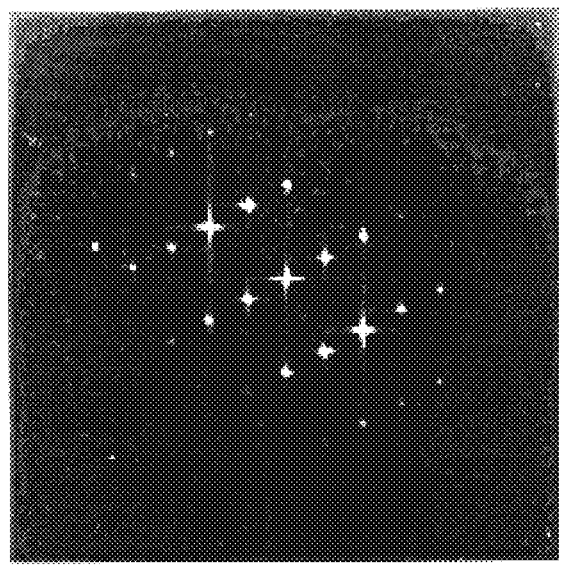
FIGS. 9A through 9C are Fast Fourier Transformation (FFT) images for regions A, B and C of FIG. 8, respectively.
Figure 9B:
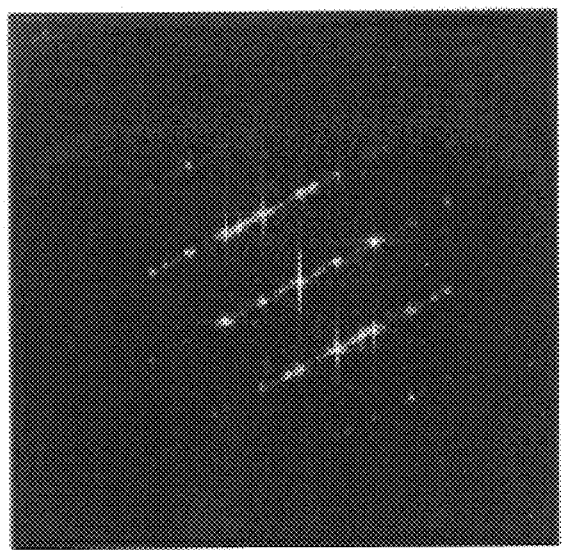
Figure 9C:

In order to investigate the present state of cubic and hexagonal phases in phosphors (Samples 1 through 3), each phosphor was prepared thinly, and then the cross-sections were analyzed using Transmission Electron Microscopy (TEM). FIG. 6 shows an electron diffraction pattern of Sample 1. As shown in FIG. 6, both cubic and hexagonal phases are present in the ZnS:Cu,Al phosphor. The TEM images of Samples 1, 2 and 3 are shown in FIGS. 7A, 7B and 7C, respectively. FIGS. 7A, 7B and 7C show that the center region, and the boundary region near the surface (indicated by arrows) have different structures. For Sample 3 synthesized using the iodide series fluxes, the boundary region is wider than the other samples. FIG. 8 shows a TEM image of Sample 1, measured at ultra-high voltage and high resonance. Fast Fourier transform (FFT) images of regions A, B and C in FIG. 8 are shown in FIGS. 9A through 9C. Region A corresponding to the center of the phosphor has hexagonal phases as shown in FIG. 9A. Region B near the surface of the phosphor has cubic phases as shown in FIG. 9C. Also, both hexagonal and cubic phases are detected in region B shown in FIG. 9B.

The results of the XRD and TEM analyses indicate that the zinc sulfide based phosphor ZnS:Cu,Al having high emission at a low voltage has both hexagonal and cubic phases, and the cubic phase increases for Sample 1, Sample 2 and Sample 3, consecutively. It can be concluded that the cubic phase is advantages in increasing luminance, compared to the hexagonal phase, in view of crystallography.

As previously mentioned, the inventive method for synthesizing a green-light emitting zinc sulfide based phosphor, ZnS:Cu, Al, which is applicable to a device operated with a low voltage, is characterized in the use of novel raw materials. Cu is used as an activator, wherein monovalent copper ($Cu^{1-}$) is complexed with ammonia and the ammonia complex is incorporated so as to uniformly distribute the activator in the mixture of raw materials. Al is used as a co-activator, and, $ZnI_2$ and NaI are added as iodide series fluxes. Thus, the color display characteristics are improved with a relatively high color purity and luminance.

Chloride series fluxes such as $ZnCl_2$ and NaCl grow round phosphor crystals around many axes due to their rapid reaction rate, compared to iodide series fluxes. On the other hand, for the iodide series fluxes, which have a relatively slow reaction rate, the phosphor crystals are grown around a single axis, so that plate or column-like crystals are obtained. In addition, use of iodide series fluxes produce more cubic phases near the surface of phosphors, which allow easy infiltration of electron beam into phosphors, thereby enhancing luminance.

While this invention has been particularly shown and described with reference to preferred embodiments thereof, it will be understood by those skilled in the art that various changes in form and details may be made thereto without departing from the spirit and scope of the invention as defined by the appended claims.

What is claimed is:

1. A method for preparing a zinc sulfide based phosphor having effective emission at low voltages, the zinc sulfide based phosphor comprising Cu as an activator, and Al as a co-activator, the method comprising the steps of:

(a) weighing ZnS, CuI, $AlF_3$ and at least two iodide series fluxes having a high purity, and uniformly mixing the ZnS, CuI, $AlF_3$ and the at least two iodide series fluxes with deionized water to form a paste;

(b) drying the paste and sieving to form uniform particles, and firing the particles to obtain phosphors; and (c) sieving and washing the phosphors with deionized water to remove impurities and the fluxes from the phosphors.

2. The method of claim 1, wherein in step (a), the monovalent copper ($Cu^{1+}$) is complexed with ammonia.

3. The method of claim 2, wherein in step (a), the monovalent copper ($Cu^{1-}$) is mixed in an amount of 0.003 to 7.10% by weight.

4. The method of claim 1, wherein, in step (a), $AlF_3$ is mixed in an amount of 0.002 to 0.15% by weight.

5. The method of claim 1, wherein, in step (a), NaI as one of the iodide series fluxes is mixed in an amount of 0.005 to 2.0% by weight.

6. The method of claim 1, wherein, in step (a), $ZnI_2$ as one of the iodide series fluxes is mixed in an amount of 0.002 to 2.0% by weight.

7. The method of claim 1, wherein, in step (b), the particles are put into a carbon crucible and are fired in a reduction atmosphere so as to prevent the phosphors from being oxidized during the firing.

8. The method of claim 1, wherein the iodide series fluxes comprise NaI and $ZnI_2$.

9. A method for preparing a zinc sulfide based phosphor having effective emission at low voltages, the zinc sulfide based phosphor comprising Cu as an activator, Al as a co-activator, the method comprising the steps of:

(a) uniformly mixing ZnS, CuI, $AlF_3$ and at least two iodide series fluxes with deionized water to form a paste;

(b) drying the paste and sieving to form uniform particles, and firing the particles to obtain phosphors; and (c) sieving and washing the phosphors with deionized water to remove impurities and the fluxes from the phosphors.

10. The method of claim 9, wherein the iodide series fluxes comprise NaI and $ZnI_2$.

* * * * *